Patented Dec. 13, 1927.

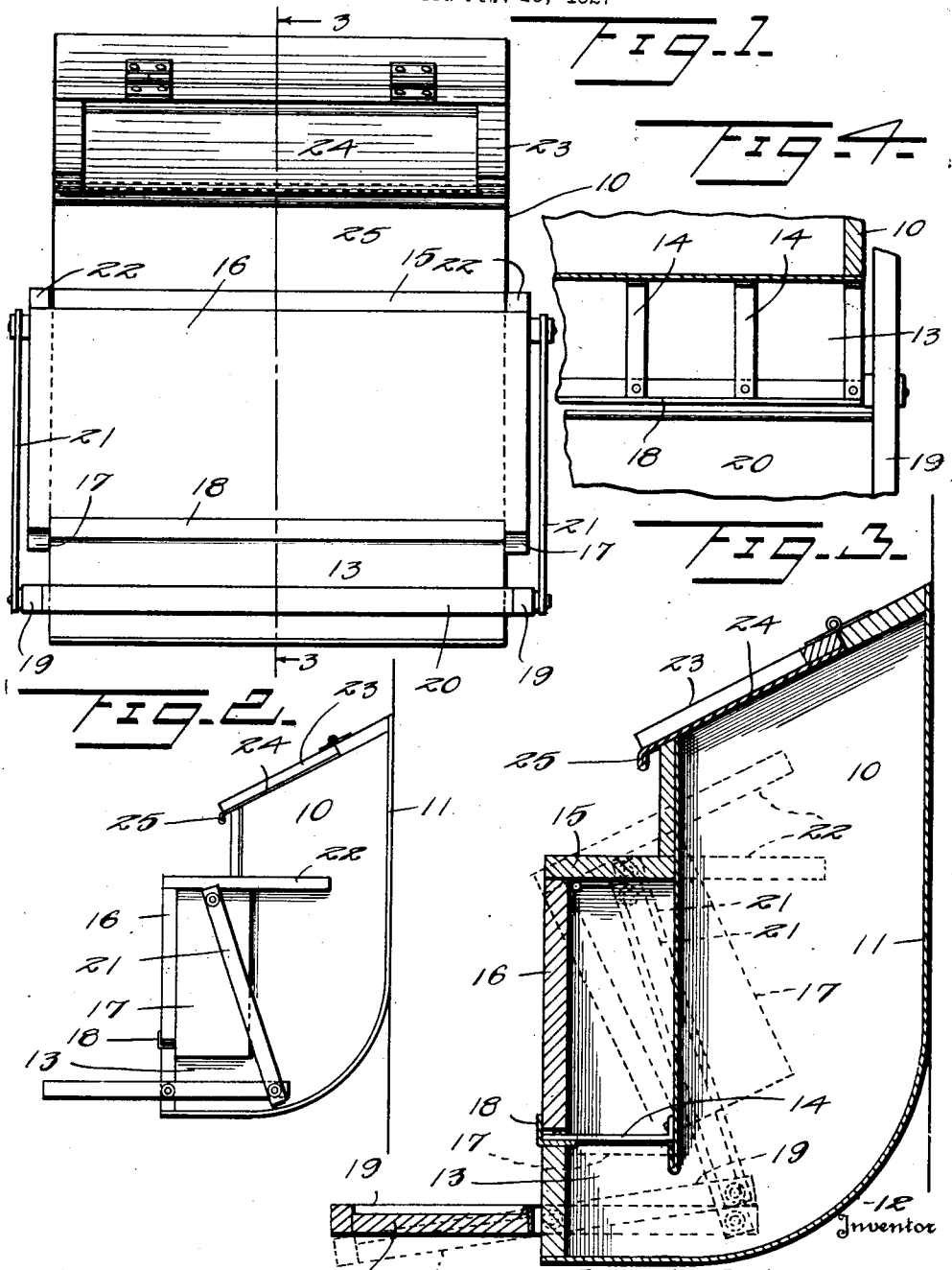

1,652,727

UNITED STATES PATENT OFFICE.

EMIL OCHSNER, OF SUTTON, NEBRASKA.

POULTRY FEEDER.

Application filed February 16, 1927. Serial No. 168,767.

This invention relates to new and useful improvements in poultry feeders, and particularly to automatic feeders.

One object of the invention is to provide a device of this character which is adapted to be suspended on the wall of a poultry house, whereby to prevent access of rodents.

Another object is to provide a device of this character wherein the feed is properly covered, so that dust and dirt cannot enter, such feed being exposed only upon operation of the depressible platform by the poultry.

Another object is to so form the device that the poultry cannot roost thereon.

Other objects and advantages will be apparent from the following description when taken in connection with the accompanying drawing.

In the drawing:

Figure 1 is a front elevation of a poultry feeder made in accordance with the present invention.

Figure 2 is a side elevation of the same, on a reduced scale.

Figure 3 is a vertical central sectional view on the line 3—3 of Figure 1, the platform being shown in depressed position by dotted lines.

Figure 4 is a fragmentary top plan view of the access opening for the poultry to reach the feed.

Referring particularly to the accompanying drawing, 10 represents a suitably sized box having the rear vertical wall 11, and the downwardly and forwardly extending curved bottom 12. The front of the box is formed with a forwardly extending offset 13, just above the bottom, and such offset is open in its upper side and provided with the forwardly and rearwardly extending division bars 14, to divide the same into a series of separate feeding spaces. Disposed at a suitable distance above the feeding spaces, and projecting outwardly thereover, is a horizontal wall 15. Hinged to the forward edge of this wall 15 is a depending closure 16, and attached to the ends of this closure are the end walls 17, which prevent access to the feeding spaces from the sides of the box. Extending vertically along the forward edge of the feed box offset 13 is a metal strip 18, against which the lower free edge of the closure is adapted to abut, to prevent outward swinging of the closure beyond its fully closed position.

Pivotally mounted on the opposite sides of the offset 13, and extending forwardly and rearwardly thereof, are the rocker arms 19, and secured to the forward ends of said arms, and arranged transversely of the front of said offset, is a platform 20. Pivotally connected to the rear end of each arm 19, at its lower end, and to the upper end of an end wall 17, at its other end, is a vertical link 21. Extending rearwardly from the upper end of each of said end walls 17 is a weighted arm 22, which maintains the closure normally in forward closed position.

The upper portion of the box 10 inclines downwardly and forwardly, to prevent the poultry from roosting on the top of the feed box. This top is provided with a hinged lid 23, permitting access to the interior of the box, for cleaning and refilling with feed. It will be particularly noted that the upper ends of the links 21 are pivotally connected to the end walls 17 inwardly of the line of the hinges of the closure, whereby when a fowl steps upon the platform, the weight of the fowl will cause the platform to swing down, and through the upward pressure upon the links 21, the closure will be swung inwardly to uncover the upper open portion of the feeding offset box, and permit the poultry access to the feed. The curvature of the bottom of the box 10 permits the feed to slide downwardly into the space beneath the bars 14. When there is no weight on the platform, such platform will rise, and the closure swing into closed position by the action of the weighted arms 22.

The major portion of the lid 23 is formed from a sheet of metal 24, the forward edge of which is turned down, at 25, to prevent entrance of dirt or moisture into the box 10.

What is claimed is:

A poultry feeder comprising a box having an offset feeding compartment having an upwardly directed and divided access opening, a transverse stop at the outer side of said opening, a vertical swinging closure movable over the access opening of the feeding compartment, and walls on the closure overlapping the ends of the box, intermediately pivoted arms mounted on the sides of the feeding compartment, links pivotally connected with the rear ends of said arms and pivotally connected with said end walls forwardly of the pivots of said arms, weighted arms on the upper portions of said end walls extending rearwardly of said arm pivots, and a platform on the arms forwardly of the feeding compartment.

In testimony whereof, I affix my signature.

EMIL OCHSNER.